(12) United States Patent
Onodera

(10) Patent No.: US 9,150,211 B2
(45) Date of Patent: Oct. 6, 2015

(54) CONTROL APPARATUS FOR VEHICLE

(71) Applicant: HONDA MOTOR CO., LTD., Tokyo (JP)

(72) Inventor: Takayuki Onodera, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/417,403

(22) PCT Filed: Feb. 10, 2014

(86) PCT No.: PCT/JP2014/052988
§ 371 (c)(1),
(2) Date: Jan. 26, 2015

(87) PCT Pub. No.: WO2014/156337
PCT Pub. Date: Oct. 2, 2014

(65) Prior Publication Data
US 2015/0203090 A1 Jul. 23, 2015

(30) Foreign Application Priority Data

Mar. 25, 2013 (JP) .................................. 2013-061642

(51) Int. Cl.
*B60W 10/06* (2006.01)
*B60W 10/107* (2012.01)

(52) U.S. Cl.
CPC ............. *B60W 10/06* (2013.01); *B60W 10/107* (2013.01); *B60W 2710/065* (2013.01); *B60W 2710/10* (2013.01)

(58) Field of Classification Search
None
See application file for complete search history.

(56) References Cited

U.S. PATENT DOCUMENTS

| 2010/0167872 | A1* | 7/2010 | Shirasaka et al. | ............... 477/45 |
| 2011/0054765 | A1* | 3/2011 | Lewis et al. | .................. 701/112 |
| 2013/0191012 | A1* | 7/2013 | Hirotsu et al. | ................ 701/113 |

FOREIGN PATENT DOCUMENTS

| JP | 08-166058 A | 6/1996 |
| JP | 11-324755 A | 11/1999 |
| JP | 11-336586 A | 12/1999 |
| JP | 11-343892 A | 12/1999 |

(Continued)

OTHER PUBLICATIONS

International Search Report dated May 20, 2014 issued in corresponding application No. PCT/JP2014/052988.

(Continued)

*Primary Examiner* — Edwin A Young
(74) *Attorney, Agent, or Firm* — Westerman, Hattori, Daniels & Adrian, LLP

(57) ABSTRACT

A control apparatus for a vehicle provided with an internal combustion engine, an oil pump actuated by the engine for pressurizing operation oil, and a belt-type continuously variable transmission to which the operation oil pressurized by the oil pump is supplied, is provided. Transmission control of the continuously variable transmission is performed by controlling an operation oil pressure supplied to the continuously variable transmission. An idling stop for automatically stopping the engine is performed when a predetermined condition is satisfied. A transmission ratio change history of the continuously variable transmission after an ignition switch of the vehicle is turned on, is stored, and the predetermined condition is satisfied on condition that the transmission ratio change history includes a predetermined transmission ratio change history.

6 Claims, 8 Drawing Sheets

(56) References Cited

FOREIGN PATENT DOCUMENTS

| | | |
|---|---|---|
| JP | 11-343893 A | 12/1999 |
| JP | 2006-283809 A | 10/2006 |
| JP | 2010-230132 A | 10/2010 |
| JP | 2011-133013 A | 7/2011 |
| JP | 2011-185378 A | 9/2011 |
| JP | 2011-185380 A | 9/2011 |
| JP | 2012-31955 A | 2/2012 |
| JP | 2013-24249 A | 2/2013 |
| JP | 2013-36609 A | 2/2013 |
| WO | 2012/085999 A1 | 6/2012 |

OTHER PUBLICATIONS

Japanese Notice of Allowance dated Sep. 9, 2014, issued in corresponding Japanese Patent Application No. 2014-525255, 7 pages. (w/English translation).

\* cited by examiner

CONTROL APPARATUS FOR VEHICLE

TECHNICAL FIELD

The present invention relates to a control apparatus for a vehicle which is driven by an internal combustion engine and provided with an oil pump actuated by the internal combustion engine, and a belt-type continuously variable transmission controlled using operation oil pressurized by the oil pump.

BACKGROUND ART

Patent Document 1 (shown below) shows a control apparatus for a vehicle having an oil pump actuated by an internal combustion engine and a belt-type continuously variable transmission controlled with operation oil pressurized by the oil pump. In this control apparatus, a so-called idling stop is performed wherein the engine is automatically stopped when a predetermined condition (e.g., the vehicle speed is substantially "0", and the brake pedal is depressed) is satisfied.

According to this control apparatus, when the time period elapsed from the start time of the idling stop reaches a predetermined time period which is set according to an operation oil temperature, restart of the engine (early restart) is performed even if the predetermined condition is satisfied. When the continuing time period of the idling stop becomes long, rise in the operation oil pressure upon terminating the idling stop (upon restarting the engine) may be delayed, which causes hesitation of the vehicle start performance. Such inconvenience is prevented by performing the above-described early restart.

PRIOR ART DOCUMENT

Patent Document

Patent Document 1: Japanese Patent Laid-Open Publication No. 2010-230132

SUMMARY OF THE INVENTION

Problems to be Solved by the Invention

In the apparatus shown in Patent Document 1, the predetermined time period is set according to the operation oil temperature in order to prevent belt slippage upon restarting the engine from occurring, the belt slippage being caused by leakage of the operation oil from the oil pressure chamber (piston chamber) for actuating a pulley of the continuously variable transmission. The reason for the above setting of the predetermined time period is that the leakage amount of the operation oil changes depending on the operation oil temperature.

However, there still exists the following problem which is not solved only by considering the above-described leakage of the operation oil. That is, if the vehicle is stopped and left non-operated for a long time period, air may sometimes enter the oil pressure chamber. In such condition, if the vehicle starts running after restart of the engine and the predetermined condition is satisfied before transmission ratio change of the continuously variable transmission is sufficiently performed, the idling stop is performed in the state where the air entering the oil pressure chamber still exists in the oil pressure chamber. Consequently, a time period necessary for filling up the oil pressure chamber with operation oil becomes longer, which may sometimes cause hesitation of the vehicle start upon restarting the engine after the idling stop.

The present invention was made contemplating this point, and an objective of the present invention is to provide a control apparatus for a vehicle, which makes it possible to avoid vehicle start hesitation upon restarting the engine after the idling stop (automatic engine stop), the vehicle start hesitation being caused by air that enters the oil pressure chamber for actuating the pulley of the continuously variable transmission while the vehicle is left non-operated.

Solution to the Problem

To attain the above objective, in a control apparatus for a vehicle provided with an internal combustion engine (1), an oil pump (71) actuated by the engine for pressurizing operation oil, and a belt-type continuously variable transmission (4) to which the operation oil pressurized by the oil pump is supplied, the present invention is characterized by comprising oil pressure control means, idling stop control means, and transmission ratio change history storing means. The oil pressure control means performs a transmission control by controlling an operation oil pressure supplied to a drive-pulley (25) and a driven-pulley (27) of the continuously variable transmission. The idling stop control means automatically stops the engine when a predetermined condition is satisfied. The transmission ratio change history storing means stores a transmission ratio change history of the continuously variable transmission (4) after an ignition switch of the vehicle is turned on. The predetermined condition is satisfied on condition that the transmission ratio change history includes a predetermined transmission ratio change history.

With this configuration, the transmission ratio change history of the continuously variable transmission after the ignition switch of the vehicle is turned on, is stored, and the predetermined condition for automatically stop the engine is satisfied on condition that the transmission ratio change history includes the predetermined transmission ratio change history. The automatic engine stop is performed if the predetermined condition is satisfied. In other words, if the stored transmission ratio change history does not include the predetermined transmission ratio change history, the automatic engine stop is not performed even if the other requirements for performing the automatic engine stop are satisfied. Accordingly, by setting the predetermined transmission ratio change history to such a history that the air contained in the oil pressure chamber is discharged, the automatic engine stop is prevented from being performed in the air contained state of the oil pressure chamber, which makes it possible to avoid the vehicle start hesitation upon restarting the engine after the automatic engine stop.

Preferably, the predetermined transmission ratio change history is a history in which a transmission ratio change from a transmission ratio within a first transmission ratio range (RR5) to a transmission ratio within a second transmission ratio range (RR1) and a transmission ratio change from a transmission ratio within the second transmission ratio range (RR1) to a transmission ratio within the first transmission ratio range (RR5), are performed.

With this configuration, the predetermined transmission ratio change history is set to the history in which the transmission ratio change from a transmission ratio within the first transmission ratio range to a transmission ratio within the second transmission ratio range and the transmission ratio change from a transmission ratio within the second transmission ratio range to a transmission ratio within the first transmission ratio range, are performed. For example, if the second transmission ratio range is a range on the high-speed side (a smaller transmission ratio range) compared with the first transmission ratio range, the volume of the oil pressure chamber in the movable pulley half-body of the drive-pulley in the first transmission ratio range is less than that in the second transmission ratio range. Accordingly, by performing the transmission ratio change from a transmission ratio within the second transmission ratio range to a transmission ratio within the first transmission ratio range, the air contained in the oil pressure chamber of the drive-pulley can be discharged. On the other hand, the volume of the oil pressure chamber in the movable pulley half-body of the driven-pulley in the second transmission ratio range is less than that in the first transmission ratio range. Accordingly, by performing the transmission ratio change from a transmission ratio within the first transmission ratio range to a transmission ratio within the second transmission ratio range, the air contained in the oil pressure chamber of the driven-pulley can be discharged. Consequently, the up-and-down transmission ratio change history in which both of the transmission ratio changes in two directions, makes it possible to surely discharge the air contained in the oil pressure chambers in both of the drive-pulley and the driven-pulley.

Alternatively, the predetermined transmission ratio change history may be a history including a plurality of histories in which a transmission ratio change from a transmission ratio within a third transmission ratio range (RR4) to a transmission ratio within a fourth transmission ratio range (RR2) and a transmission ratio change from a transmission ratio within the fourth transmission ratio range (RR2) to a transmission ratio within the third transmission ratio range (RR4), are performed.

With this configuration, the predetermined transmission ratio change history is set to a history including a plurality of histories in which the transmission ratio change from a transmission ratio within a third transmission ratio range (RR4) to a transmission ratio within a fourth transmission ratio range (RR2) and the transmission ratio change from a transmission ratio within the fourth transmission ratio range (RR2) to a transmission ratio within the third transmission ratio range (RR4), are performed. If the up-and-down transmission ratio change operation between a transmission ratio within the third transmission ratio range and a transmission ratio within the fourth transmission ratio range, is performed, the air contained in the oil pressure chambers of the drive-pulley and driven-pulley is discharged. However, there is a possibility that the air contained in the oil pressure chambers is not completely discharged if the change width of the transmission ratio is comparatively small. Accordingly, by setting the predetermined transmission change ratio history to the history including a plurality of the up-and-down transmission ratio change histories, the air in the oil pressure chambers can surely be discharged.

Preferably, the predetermined transmission ratio change history is one of the following first and second histories. The first history is a history in which a transmission ratio change from a transmission ratio within a fifth transmission ratio range (RR5) to a transmission ratio within a sixth transmission ratio range (RR1) and a transmission ratio change from a transmission ratio within the sixth transmission ratio range (RR1) to a transmission ratio within the fifth transmission ratio range (RR5), are performed. The second history is a history including a plurality of histories in which a transmission ratio change from a transmission ratio within a seventh transmission ratio range (RR4) to a transmission ratio within an eighth transmission ratio range (RR2) and a transmission ratio change from a transmission ratio within the eighth transmission ratio range (RR2) to a transmission ratio within the seventh transmission ratio range (RR4), are performed. The fifth transmission ratio range (RR5) is a transmission ratio range in which the vehicle can start, and the seventh and eighth transmission ratio ranges (RR4, RR2) are positioned between the fifth transmission ratio range (RR5) and the sixth transmission ratio range (RR1).

With this configuration, the predetermined transmission ratio change history is set to the first history or the second history, wherein the first history is the history in which the transmission ratio change from a transmission ratio within the fifth transmission ratio range to a transmission ratio within the sixth transmission ratio range and the transmission ratio change from a transmission ratio within the sixth transmission ratio range to a transmission ratio within the fifth transmission ratio range, are performed, and the second history is the history including a plurality of histories in which the transmission ratio change from a transmission ratio within the seventh transmission ratio range to a transmission ratio within the eighth transmission ratio range and the transmission ratio change from a transmission ratio within the eighth transmission ratio range to a transmission ratio within the seventh transmission ratio range, are performed. The fifth transmission ratio range is set to the transmission ratio range in which the vehicle can start, and the seventh and eighth transmission ratio ranges are set to a transmission ratio range between the fifth transmission ratio range and the sixth transmission ratio range.

In other words, the predetermined transmission ratio change history is set to a history where one up-and-down transmission ratio change operation of a comparatively large change width is performed, or to a history where a plurality of up-and-down transmission ratio change operations of a comparatively small change width are performed. Accordingly, it is possible to perform the condition determination suitable to various vehicle running conditions, which can hasten the timing at which the predetermined condition for performing the automatic engine stop is satisfied, within the range where the vehicle start hesitation can be avoided.

Preferably, each of the drive-pulley and the driven-pulley comprises a fixed pulley half-body (25a, 27a) and a movable pulley half-body (25b, 27b), and is configured so that the operation oil is supplied to the oil pressure chamber (25c, 27c) of the movable pulley half-body (25b, 27b). Flowing-in of the operation oil to the oil pressure chamber and flowing-out of the operation oil from the oil pressure chamber are performed through a communication passage (42, 45) which communicates the oil pressure chamber to an oil passage (43, 46) provided within a rotation shaft (24, 26) of the movable pulley half-body.

With this configuration, flowing-in of the operation oil to the oil pressure chamber and flowing-out of the operation oil from the oil pressure chamber are performed through the communication passage which communicates the oil pressure chamber to the oil passage provided within the rotation shaft of the movable pulley half-body. When the movable pulley half-body rotates, air of smaller density compared with the operation oil moves toward the rotation shaft (since the centrifugal force in a direction contrary to the rotation shaft more greatly acts on the operation oil of larger density), thereby making it possible to surely discharge the air via the communication passage.

Preferably, the transmission ratio change history storing means stores the transmission ratio change history whenever the ignition switch is turned on.

With this configuration, the transmission ratio change history is stored whenever the ignition switch is turned on.

Discharge of the oil pump ends at the time when a time period of about 30 minutes has elapsed from the time the ignition switch is turned off, and air begins to enter the oil pressure chamber, which may cause the vehicle start hesitation. Accordingly, by storing the transmission ratio change history whenever the ignition switch is turned on and checking the stored history, it is possible to surely avoid the vehicle start hesitation upon restarting the engine after the automatic engine stop.

MODE FOR CARRYING OUT THE INVENTION

Preferred embodiments of the present invention will now be described with reference to the drawings.

Figure 1:
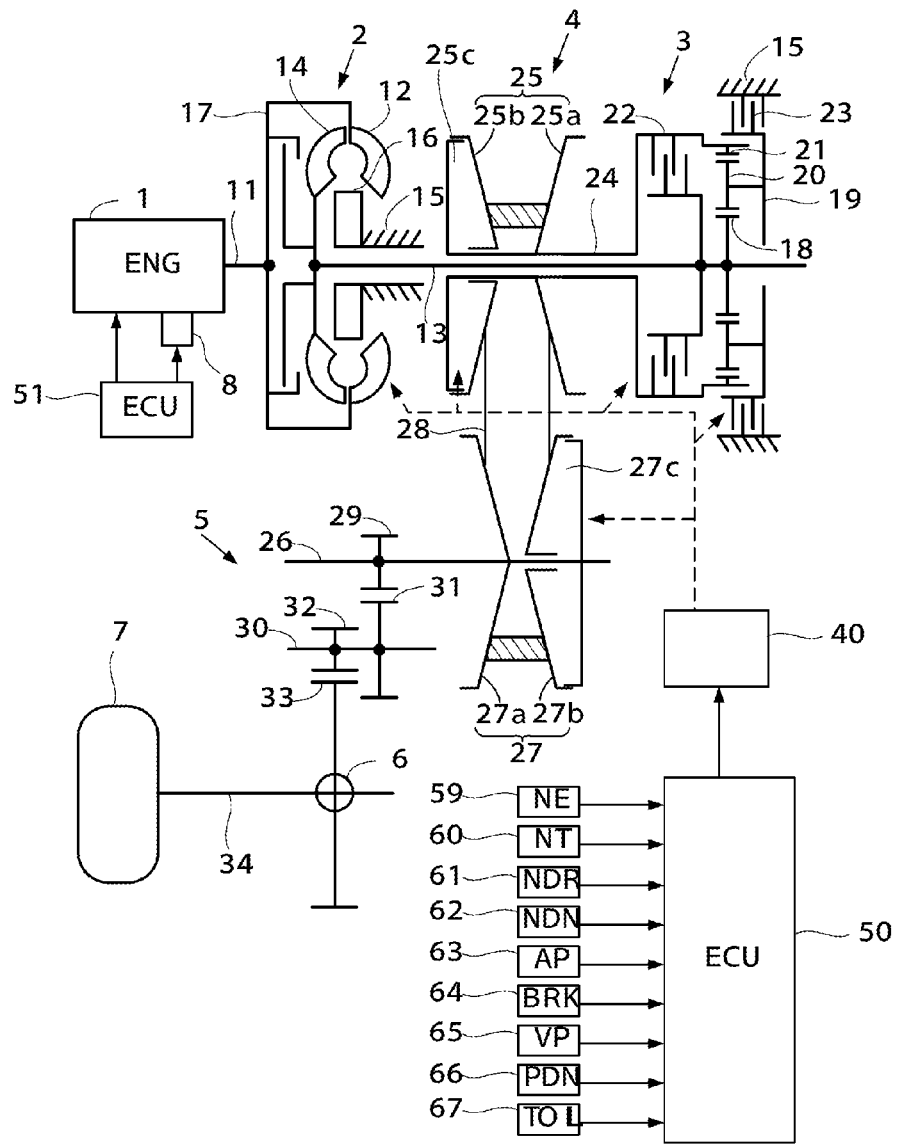
FIG. 1 shows a configuration of a vehicle power train including a belt-type continuously variable transmission according to one embodiment of the present invention.

FIG. 1 shows a configuration of a vehicle power train including a belt-type continuously variable transmission according to one embodiment of the present invention. In FIG. 1, the driving force of an internal combustion engine (hereinafter referred to as "engine") 1 is transmitted to driving wheels 7 through a torque converter 2, a forward/backward switching mechanism 3, a belt-type continuously variable transmission (hereinafter referred to as "CVT") 4, a reduction-gear sequence 5, and a differential gear 6.

The torque converter 2 includes a pump 12 connected to the crankshaft 11 of the engine 1, a turbine 14 connected to an input shaft 13, a stator 16 fixed to a casing 15, and a lock-up clutch 17 for directly connecting the crankshaft 11 with the input shaft 13. When the lock-up clutch is disengaged, the torque converter 2 reduces a rotational speed of the crankshaft 11, amplifies a torque of the crankshaft 11, and transmits the amplified torque to the input shaft 13.

The forward/backward switching mechanism 3, which utilizes a planetary gear mechanism, includes a sun gear 18 fixed to the input shaft 13, a plurality of pinions 20 supported by a planetary carrier 19 and meshed with the sun gear 18, and a ring gear 21 meshed with the pinion 20. The ring gear 21 is configured so as to be connectable to the input shaft 13 through a forward clutch 22. The planetary carrier 19 is configured so as to be connectable to the casing 15 through the reverse brake 23.

When the forward clutch 22 is engaged, the input shaft 13 is directly connected to a pulley drive shaft 24 which is configured in one body with the ring gear 21, and the pulley drive shaft 24 rotates in the same direction at the same rotational speed as the input shaft 13. When the reverse brake 23 is engaged, the planetary carrier 19 is fixed with the casing 15, and the pulley drive shaft 24 rotates in the opposite direction at a reduced rotational speed with respect to the rotation of the input shaft 13.

The CVT 4 includes a drive-pulley 25 supported by the pulley drive shaft 24, a driven-pulley 27 supported by an output shaft 26, and a metal belt 28 wound around the drive-pulley 25 and the driven-pulley 27. The drive-pulley 25 has a fixed pulley half-body 25a fixed to the pulley drive shaft 24, a movable pulley half-body 25b slidably but not rotatably supported by the pulley drive shaft 24, and two cylinder chambers 25c. The movable pulley half-body 25b is energized toward the fixed pulley half-body 25a with the oil pressure supplied to the cylinder chambers 25c. The driven-pulley 27 has a fixed pulley half-body 27a fixed to the output shaft 26, a movable pulley half-body 27b slidably but not rotatably supported by the output shaft 26, and a cylinder chamber 27c. The movable pulley half-body 27b is energized toward the fixed pulley half-body 27a with the oil pressure supplied to the cylinder chamber 27c. It is to be noted that a bias spring not shown is provided in the cylinder chamber 27c for energizing the movable pulley half-body 27b toward the fixed pulley half-body 27a.

By applying the first control oil pressure PDR to the cylinder chambers 25c of the drive-pulley 25, applying the second control oil pressure PDN to the cylinder chamber 27c of the driven-pulley 27, and reducing the first control oil pressure PDR, the movable pulley half-body 25b of the drive-pulley 25 moves away from the fixed pulley half-body 25a, and the effective diameter of the pulley decreases. Further, by increasing the second control oil pressure PDN, the movable pulley half-body 27b of the driven-pulley 27 moves toward the fixed pulley half-body 27a, and the effective diameter of the pulley increases. Consequently, the transmission ratio RATIO of the CVT 4 increases (changes in the direction to a ratio suitable for the low speed running). It is to be noted that only one of the decrease in the first control oil pressure PDR and the increase in the second control oil pressure PDN makes the transmission ratio RATIO change similarly.

In contrast, by increasing the first control oil pressure PDR and reducing the second control oil pressure PDN, the movable pulley half-body 25b of the drive-pulley 25 moves toward the fixed pulley half-body 25a, and the effective diameter of the pulley increases, and the movable pulley half-body 27b of the driven-pulley 27 moves away from the fixed pulley half-body 27a, and the effective diameter of the pulley decreases. Consequently, the transmission ratio RATIO of the CVT 4 decreases (changes in the direction to a ratio suitable for the high speed running) It is to be noted that only one of the increase in the first control oil pressure PDR and the decrease in the second control oil pressure PDN makes the transmission ratio RATIO change similarly.

A first reduction gear 29 fixed on the output shaft 26 meshes with a second reduction gear 31 fixed on a reduction shaft 30, and a final drive-gear 32 fixed on the reduction shaft 30 meshes with a final driven-gear 33 of the differential gear 6. The driving wheels 7 are mounted on right and left wheel shafts 34 extending from the differential gear 6.

The first and second control oil pressures PDR and PDN supplied to the cylinder chambers 25c and 27c of the CVT 4, and the operation oil pressures for actuating the forward clutch 22, the reverse brake 23, and the lock-up clutch 17 are controlled by an electronic control unit (hereinafter referred to as "ECU") 50 for controlling the transmission through an oil pressure control device 40.

The detection signals from the following sensors and other various sensors not shown are supplied to the ECU 50: an engine rotational speed sensor 59 for detecting an engine rotational speed NE, an input shaft rotational speed sensor 60 for detecting a rotational speed NT of the input shaft 13, a pulley drive shaft rotational speed sensor 61 for detecting a rotational speed NDR of the pulley drive shaft 24, an output shaft rotational speed sensor 62 for detecting a rotational speed NDN of the output shaft 26, an accelerator sensor 63 for detecting an operation amount AP of the accelerator pedal of the vehicle, a brake switch 64 for detecting depression of the brake pedal, a vehicle speed sensor 65 for detecting a running speed (vehicle speed) VP of the vehicle, a driven-pulley control oil pressure sensor 66 for detecting the second control oil pressure PDN, and an operation oil temperature sensor 67 for detecting an operation oil temperature TOIL. The ECU 50 performs control of the first and second control oil pressures PDR and PDN, and actuation control of the forward clutch 22, the reverse brake 23, and the lock-up clutch 17, according to the detected vehicle running speed VP, the operation amount AP of the accelerator pedal, the engine rotational speed NE, and the like.

The engine 1 is provided with well-known fuel injection valves, spark plugs, and a throttle valve, and operation of the engine 1 is controlled by an ECU 51 for engine control. The ECU 51 is connected with the ECU 50 through a data bus (not shown), which makes it possible for the ECU's 50 and 51 to mutually transmit and receive data required for the control. In this embodiment, the throttle valve is configured so as to be actuated by an actuator 8, and the throttle valve opening TH is controlled by the ECU 51 so as to coincide with a target opening THCMD, which is calculated according to the accelerator pedal operation amount AP.

The ECU 51 performs an intake air amount control of the engine 1 by changing the throttle valve opening according to the accelerator pedal operation amount AP. Further, the ECU 51 performs a fuel injection amount control and an ignition timing control according to engine operating parameters such as the engine rotational speed NE, the intake pressure PBA, and the like, detected by the sensors including sensors which are not shown. Further, the ECU 51 performs the automatic stoppage of the engine 1 (hereinafter referred to as "idling stop") when a predetermined idling stop execution condition is satisfied. The predetermined idling stop execution condition is satisfied, for example, when the vehicle speed VP is equal to or lower than a predetermined vehicle speed, the accelerator pedal is not depressed (the accelerator operation amount AP is "0"), the brake pedal is depressed (the brake switch 64 is turned on), the residual charge amount of the battery is equal to or greater than a predetermined amount, the engine coolant temperature TW is equal to or higher than a predetermined temperature, indicating that the warm-up of the engine 1 is completed, and the like.

Figure 2:
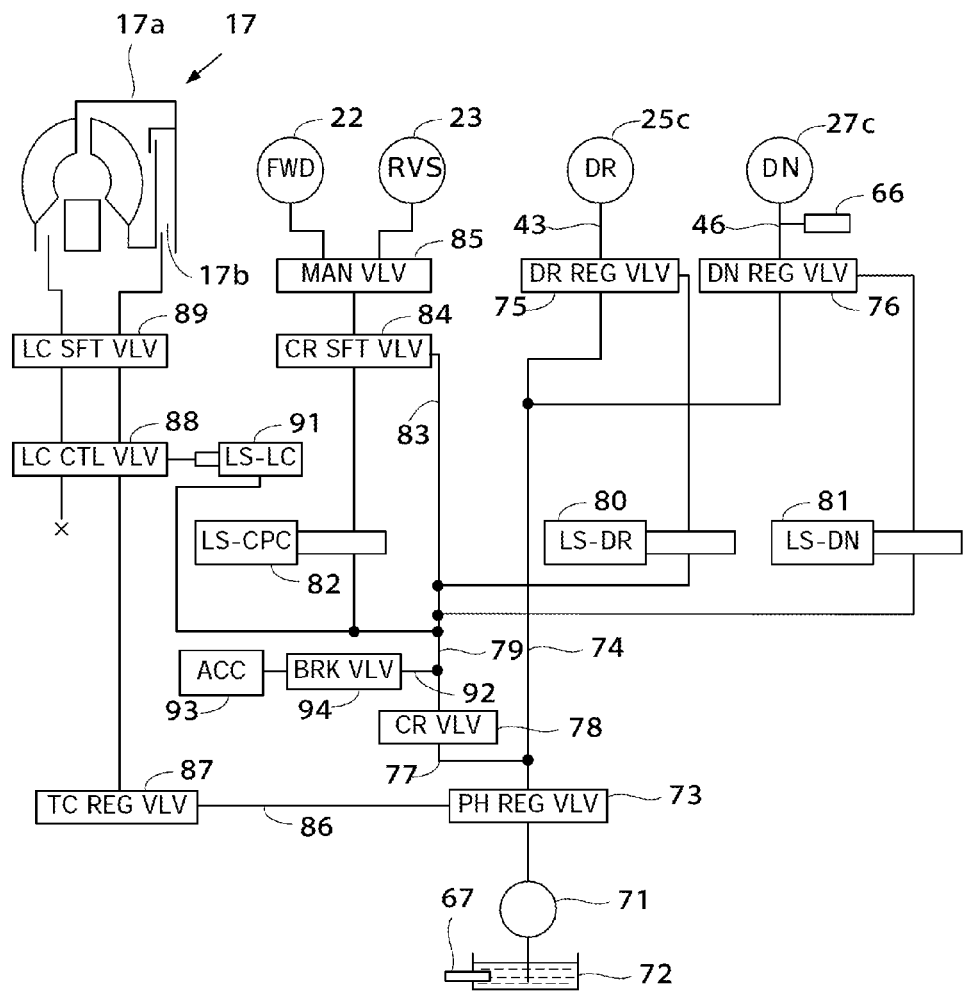
FIG. 2 is a hydraulic circuit diagram for illustrating a configuration of the oil pressure control device shown in FIG. 1.

FIG. 2 shows a hydraulic circuit for illustrating a configuration of the oil pressure control device 40 shown in FIG. 1.

The oil pressure control device 40 is provided with an oil pump 71 driven by the engine 1, and the oil pump 71 pumps up the operation oil stored in a reservoir 72, and supplies the pressurized operation oil through a PH regulation valve (PH REG VLV) 73 to the cylinder chambers 25c and 27c of the CVT 4, the forward clutch 22, the reverse brake 23, and the lock-up clutch 17, which are described above.

The PH regulation valve 73 is connected through an oil passage 74 and regulator valves (DR REG VLV, DN REG VLV) 75 and 76 to the cylinder chambers 25c of the drive-pulley and to the cylinder chamber 27c of the driven-pulley in the CVT 4. The PH regulation valve 73 is further connected through an oil passage 77 to a CR valve (CR VLV) 78, and connected through an oil passage 86 to a TC regulator valve 87. Accordingly, the predetermined line pressure PH is supplied to the connected valves. The regulator valves 75 and 76 are respectively connected to the cylinder chambers 25c and 27c through oil passages 43 and 46.

The CR valve 78 reduces the line pressure PH to generate a CR pressure (control pressure), and supplies the CR pressure to first to fourth linear solenoid valves 80, 81, 82, and 91. The first and second linear solenoid valves 80 and 81 applies the output pressure controlled by the ECU 50 to regulator valves 75 and 76, and the operation oil pressures supplied to the cylinder chambers 25c and 27c are regulated to the first and second control oil pressure PDR and PDN.

The oil passage 79 is connected to an accumulator 93 through an oil passage 92, and the oil passage 92 is provided with a brake-cooperative solenoid valve 94. The brake-cooperative solenoid valve 94 is controlled by the ECU 50 so as to close when the brake pedal is depressed, and to open when the brake pedal is released. The accumulator 93 is charged with operation oil when the engine 1 is operating. Accordingly, the brake-cooperative solenoid valve 94 closes when the brake pedal is depressed and the idling stop is performed, and when the brake pedal is released and the engine 1 is restarted, the brake-cooperative solenoid valve 94 opens to discharge the operation oil accumulated in the accumulator 93 to the oil passage 79.

The CR pressure output from the CR valve 78 is supplied also to a CR shift valve (CR SFT VLV) 84 through an oil passage 83, and further supplied through a manual valve (MAN VLV) 85 to a pressure chamber of the forward clutch 22 and a pressure chamber of the reverse brake 23.

The manual valve 85 supplies the output pressure of the CR shift valve 84 to the pressure chambers of the forward clutch 22 and the reverse brake 23 according to a position of the shift lever (not shown) operated by the driver. The output pressure of the third linear solenoid valve 82 controlled by the ECU 50 is supplied to the CR shift valve 84, to control engagement and release of the forward clutch 22 and the reverse brake 23.

The output pressure of the PH regulation valve 73 is supplied through an oil passage 86 to a TC regulator valve (TC REG VLV) 87, and the output pressure of the TC regulator valve 87 is supplied through an LC control valve (LC CTL VLV) 88 to an LC shift valve (LC SFT VLV) 89. The output pressure of the LC shift valve 89 is supplied to a pressure chamber 17a of the lock-up clutch 17 and a pressure chamber 17b which is provided on the back side of the chamber 17a.

If the operation oil is supplied through the LC shift valve 89 to the pressure chamber 17a and discharged from the pressure chamber 17b, the lock-up clutch 17 is engaged. If the operation oil is supplied to the pressure chamber 17b and discharged from the pressure chamber 17a, the lock-up clutch 17 is disengaged. The slip amount of the lock-up clutch 17 is determined by an amount of the operation oil supplied to the pressure chambers 17a and 17b.

The output pressure of the fourth linear solenoid valve 91 controlled by the ECU 50 is supplied to the LC control valve 88, and the slip amount (engagement degree) of the lock-up clutch 17 is controlled.

The driven-pulley control oil pressure sensor 66 described above is provided between the regulator valve 76 and the cylinder chamber 27c, and the operation oil temperature sensor 67 is provided in the reservoir 72.

Figure 3:
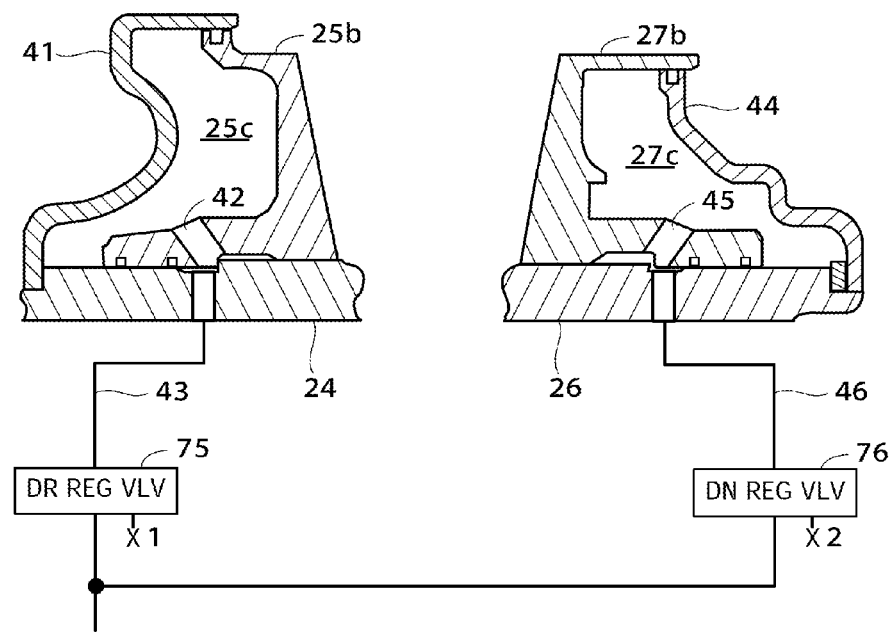
FIG. 3 is a drawing for illustrating in-flowing/out-flowing paths of the operation oil with respect to cylinder chambers (oil pressure chambers) of the continuously variable transmission.

FIG. 3 is a drawing for illustrating in-flowing/out-flowing paths of operation oil with respect to the cylinder chambers 25c and 27c of the drive-pulley 25 and the driven-pulley 27. As shown in FIG. 3, the cylinder chamber 25c of the drive-pulley 25 is defined by the movable pulley half-body 25b, a casing 41, and the pulley drive shaft 24. The cylinder chamber 25c is connected via a communicating oil passage 42 to the oil passage 43 which passes inside the pulley drive shaft 24. The oil passage 43 is connected to the regulator valve 75. The cylinder chamber 27c of the driven-pulley 27 is defined by the movable pulley half-body 27b, a casing 44, and the output shaft 26. The cylinder chamber 27c is connected via a communicating oil passage 45 to the oil passage 46 which passes inside the output shaft 26. The oil passage 46 is connected to the regulator valve 76.

Figure 4:
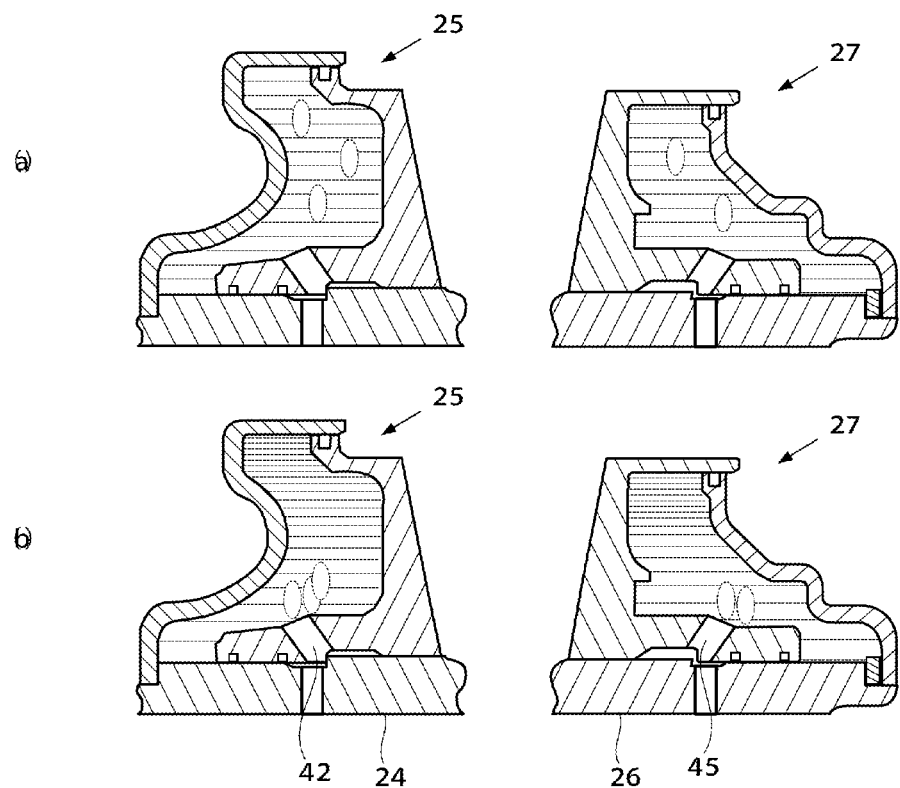
FIG. 4 shows drawings for illustrating states of air contained in the cylinder chambers.

FIGS. 4(a) and 4(b) illustrate states of air contained in the cylinder chambers. FIG. 4(a) corresponds to a state where the drive-pulley 25 and the driven-pulley 27 are stopped, and FIG. 4(b) corresponds to a state where the drive-pulley 25 and the driven-pulley 27 are rotating. In the stopped state, the contained air indicated by the ovals dispersedly exists in the cylinder chamber. In the pulley-rotating state, the contained air of lower density compared with the operation oil is biased toward the drive shaft 24 or the output shaft 26, since the centrifugal force directing outward in the radial direction of the drive shaft 24 or the output shaft 26 largely acts on the operation oil of higher density compared with air.

Accordingly, it is possible to discharge the contained air through the communicating oil passage 42 or 45 by actuating the movable pulley half-body 25b or 27b in such direction that the volume of the cylinder chamber 25c or 27c decreases, in other words, by increasing the transmission ratio RATIO from a ratio of comparatively small value with respect to the cylinder chamber 25c of the drive-pulley 25, or by reducing the transmission ratio RATIO from a ratio of comparatively great value with respect to the cylinder chamber 27c of the driven-pulley 27.

The communicating oil passage 42 is connected to the regulator valve 75 via the oil passage 43. Accordingly, the air discharged from the cylinder chamber 25c is finally discharged from a leak hole X1 of the regulator valve 75. Similarly, the air discharged from the cylinder chamber 27c is finally discharged from a leak hole X2 of the regulator valve 77.

It is to be noted that FIGS. 4(a) and 4(b) are shown for explanation, and the contained air does not actually become large bubbles indicated by the ovals.

Figure 5:
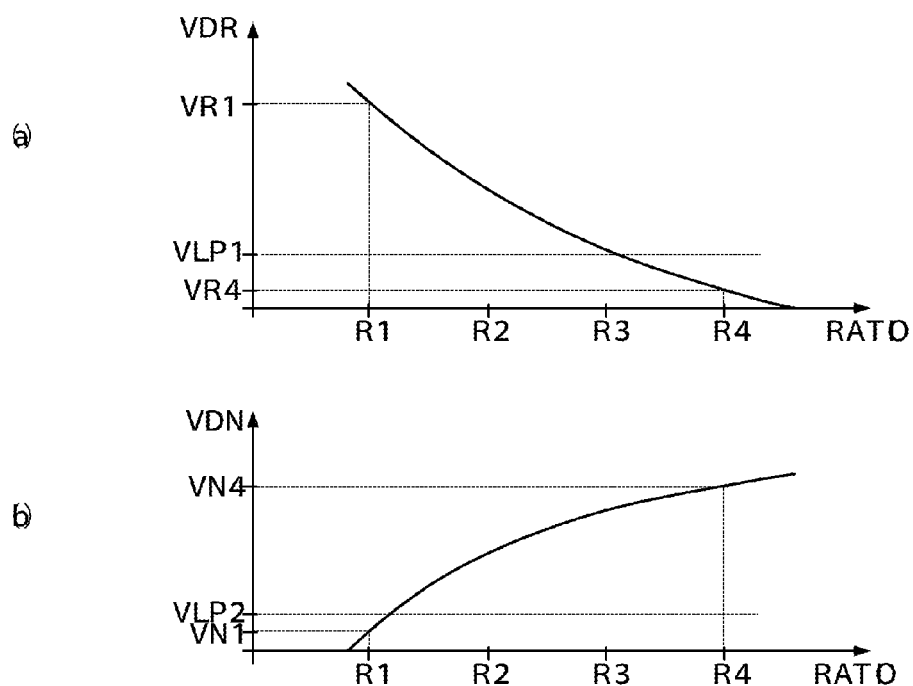
FIG. 5 shows relationships between a volume (VDR, VDN) of the cylinder chamber and a transmission ratio (RATIO).

FIGS. 5(a) and 5(b) respectively show a relationship between the volume VDR of the cylinder chamber 25c and the transmission ratio RATIO, and a relationship between the volume VDN of the cylinder chamber 27c and the transmission ratio RATIO.

If the transmission ratio RATIO changes from the transmission ratio value R1 to the transmission ratio value R4, the volume VDR of the cylinder chamber 25c of the drive-pulley decreases from the volume value VR1 to the volume value VR4, thereby discharging the operation oil (and air) of a volume corresponding to the difference (VR1−VR4). On the other hand, the volume VDN of the cylinder chamber 27c of the driven-pulley increases from the volume value VN1 to the volume value VN4, and the operation oil flows into the cylinder chamber 27c. If the transmission ratio RATIO changes from the transmission ratio value R4 to the transmission ratio value R1, the volume VDN of the cylinder chamber 27c of the driven-pulley decreases from the volume value VN4 to the volume value VN1, thereby discharging the operation oil (and air) of a volume corresponding to the difference (VN4−VN1). On the other hand, the volume VDR of the cylinder chamber 25c of the drive-pulley increases from the volume value VR4 to the volume value VR1, and the operation oil flows into the cylinder chamber 25c.

Consequently, in order to discharge the air existing in both of the cylinder chambers 25c and 27c, it is necessary to perform both of the following two operations: one is a transmission ratio change operation for decreasing the transmission ratio RATIO (a change operation toward the high-speed side transmission ratio; hereinafter referred to as "high-speed direction transmission ratio change operation"), and the other is a transmission ratio change operation for increasing the transmission ratio RATIO (a change operation toward the low-speed side transmission ratio; hereinafter referred to as "low-speed direction transmission ratio change operation").

VLP1 shown in FIG. 5(a) indicates a total oil passage volume of the communicating oil passage 42 and the oil passage 43. If the discharge amount from the cylinder chamber 25c is less than the oil passage volume VLP1, the air in the cylinder chamber 25c cannot be discharged from the leak hole X1. Accordingly, the low-speed direction transmission ratio change operation which ensures a discharge amount greater than the oil passage volume VLP1 is necessary for discharging the air from the leak hole X1. Further, VLP2 shown in FIG. 5(b) indicates a total oil passage volume of the communicating oil passage 45 and the oil passage 46. If the discharge amount from the cylinder chamber 27c is less than the oil passage volume VLP2, the air in the cylinder chamber 27c cannot be discharged from the leak hole X2. Accordingly, the high-speed direction transmission ratio change operation which ensures a discharge amount greater than the oil passage volume VLP2 is necessary for discharging the air from the leak hole X2.

As clear from FIGS. 5(a) and 5(b), the discharge amount of the operation oil (and air) becomes greater as the change width of the transmission ratio RATIO becomes greater. Accordingly, if a large width up-and-down transmission ratio change operation is once performed, the air contained in the cylinder chambers 25c and 27c can surely be discharged, wherein the large width up-and-down transmission ratio change operation, for example, includes the high-speed direction transmission ratio change operation in which the transmission ratio RATIO changes from the transmission ratio value R4 to the value R1, and the low-speed direction transmission ratio change operation in which the transmission ratio RATIO changes from the transmission ratio value R1 to the value R4.

Further, as to a small width up-and-down transmission ratio change operation, for example, including the high-speed direction transmission ratio change operation from the transmission ratio value R3 to the value R2, and the low-speed direction transmission ratio change operation from the transmission ratio value R2 to the value R3, the air discharge may not be completed with one operation. However, if the small width up-and-down transmission ratio change operation is performed a plurality of times (e.g., three times), the air can completely be discharged.

In this embodiment, the air discharge is determined to be completed as follows with consideration of the above-described points. The transmission change history of the CVT 4 is stored, and the air discharge is determined to be completed, if the stored transmission change history includes one large width up-and-down transmission ratio change operation, or a plurality of small width up-and-down transmission ratio change operations. Further, the idling stop is inhibited until the air discharge is determined to be completed after starting the engine 1, which makes it possible to avoid the vehicle start hesitation upon restarting the engine 1 after the idling stop.

In this embodiment, the accumulator 93 accumulates operation oil of the oil pressure upon operating the engine, and the accumulated operation oil is supplied to the forward clutch 22 when the brake pedal is released. If air enters the cylinder chamber(s) 25c and/or 27c, it is considered that the operation oil accumulated in the accumulator 93 may be used to compensate the reduced pressure due to the contained air, and engagement of the forward clutch 22 may slightly be delayed to cause the vehicle start hesitation.

Figure 6:
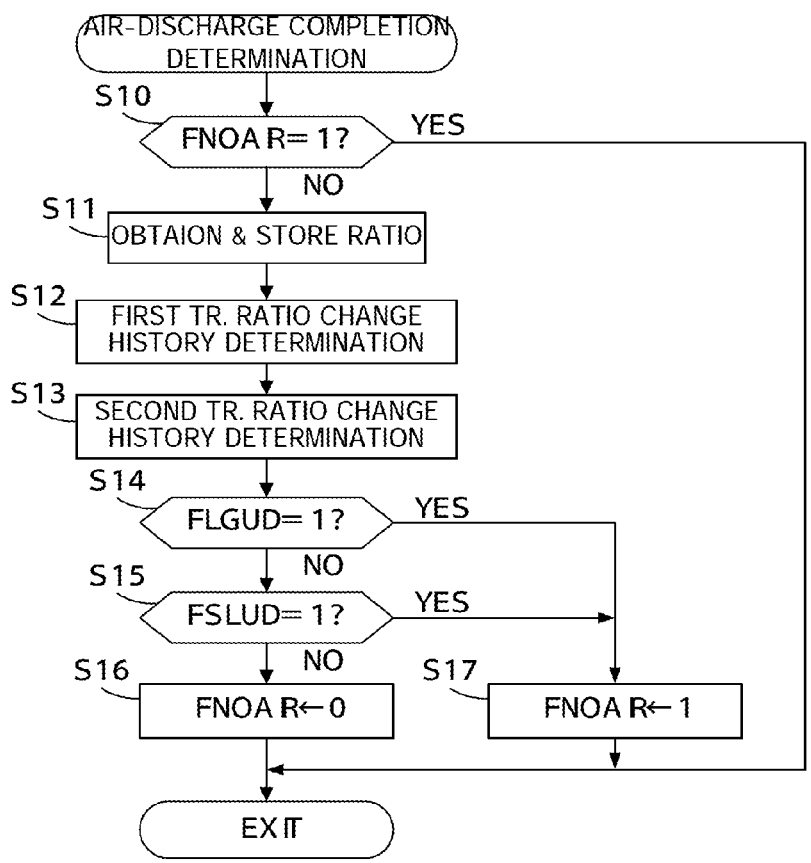
FIG. 6 is a flowchart of a process for determining completion of removing the air mixed into the cylinder chambers.

FIG. 6 is a flowchart of a process for performing the above-described determination (hereinafter referred to as "air-discharge completion determination") that the discharge of the air contained in the cylinder chamber is completed. This process is executed by the ECU 50 at predetermined time intervals after the ignition switch of the present vehicle is turned on.

In step S10, it is determined whether or not an air-discharge completion flag FNOAIR is "1". The answer to step S10 is at first negative (NO) since the air-discharge completion flag FNOAIR is "0" immediately after the ignition switch is turned on. In step S11, the transmission ratio RATIO of the CVT 4 is obtained and stored. Specifically, it is determined to what transmission ratio range RR1-RR5 the transmission ratio RATIO belongs, the transmission ranges RR1-RR5 being previously set, and the determination result (the transmission ratio change history) is stored whenever this process is executed. The transmission ratio RATIO is calculated as a ratio (NDR/NDN) of the pulley drive shaft rotational speed NDR and the output shaft rotational speed NDN.

In step S12, a first transmission ratio change history determination process is executed based on the stored transmission ratio change history. In the first transmission ratio change history determination process, a large width up-and-down transmission ratio change operation flag FLGUD is set to "1" if the large width up-and-down transmission ratio change operation described above is once performed.

If the large width up-and-down transmission ratio change operation is not detected, the large width up-and-down transmission ratio change operation flag FLGUD is maintained at "0". In this embodiment, the up-and-down transmission ratio change operation shown in FIG. 7(a) between a transmission ratio within the fifth range RR5 and a transmission ratio within the first range RR1 is defined as the large width up-and-down transmission ratio change operation.

In step S13, a second transmission ratio change history determination process is executed. In the second transmission ratio change history determination process, if the above-described small width up-and-down transmission ratio change operation described above is performed a predetermined number NO of times (e.g., 3 times), a small width up-and-down transmission ratio change operation flag FSLUD is set to "1". If the small width up-and-down transmission ratio change operation is not detected, or the number of operations is less than NO, the small width up-and-down transmission ratio change operation flag FSLUD is maintained at "0". In this embodiment, the up-and-down transmission ratio change operation shown in FIG. 7(b) between a transmission ratio within the fourth range RR4 and a transmission ratio within the second range RR2 is defined as the small width up-and-down transmission ratio change operation.

In step S14, it is determined whether or not the large width up-and-down transmission ratio change operation flag FLGUD is "1". If the answer to step S14 is affirmative (YES), the air discharge is determined to be completed and the air-discharge completion flag FNOAIR is set to "1" (step S17). If the air-discharge completion flag FNOAIR is "1", the answer to step S10 becomes affirmative (YES). Accordingly, the air-discharge completion determination is not thereafter performed, and steps S11-S17 are executed when the ignition switch is next turned on.

If the answer to step S14 is negative (NO), it is determined whether or not the small width up-and-down transmission ratio change operation flag FSLUD is "1" (step S15). If the answer to step S15 is affirmative (YES), the air discharge is determined to be completed and the process proceeds to step S17.

If the answer to step S15 is negative (NO), the air-discharge completion flag FNOAIR is maintained at "0" (step S16).

FIGS. 7(a)-7(e) are time charts for specifically illustrating the first and second transmission ratio change history determination processes described above, and show change patterns of the transmission ratio RATIO immediately after starting the engine 1 (immediately after the ignition switch is turned on). R1-R4 indicated on the vertical axis of these figures are first-fourth boundary transmission ratios by which the transmission ratio ranges RR1-RR5 are defined. The boundary transmission ratios R1-R4 are respectively set to, for example, "0.5", "1.0", "1.5", and "2.0". In FIGS. 7(a)-7(e), the operation examples are shown such as the operation is started from the initial state immediately after the ignition switch is turned on. Accordingly, changes in the transmission ratio RATIO are shown from the state where the transmission ratio RATIO is within the fifth range RR5 in all of the operation examples.

Figure 7:
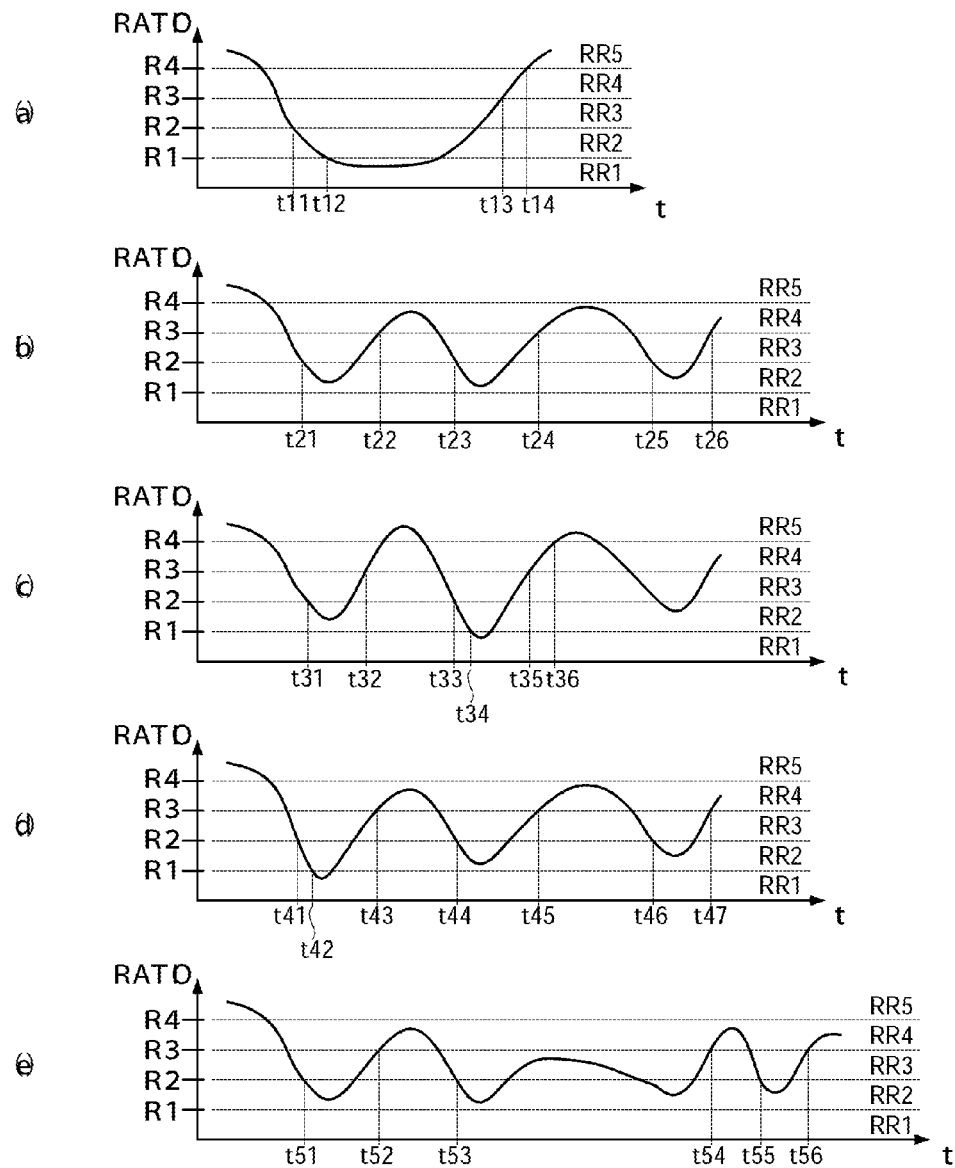
FIG. 7 shows time charts for specifically illustrating the process of FIG. 6.

In the example shown in FIG. 7(a), a change from the fourth range RR4 to the second range RR2 is detected at time t11, a change from the fifth range RR5 to the first range RR1 is detected at time t12, and a change from the second range RR2 to the fourth range RR4 is detected at time t13. Then, a first small width up-and-down transmission ratio change operation is detected. Thereafter at time t14, a change from the first range RR1 to the fifth range RR5 is detected, and one large width up-and-down transmission ratio change operation is detected. Accordingly, the large width up-and-down transmission ratio change operation flag FLGUD is set to "1" at time t14, and the air-discharge completion flag FNOAIR is also set to "1".

In the example shown in FIG. 7(b), a change from the fourth range RR4 to the second range RR2 is detected at time t21, and a change from the second range RR2 to the fourth range RR4 is detected at time t22. Then, a first small width up-and-down transmission ratio change operation is detected. Thereafter, a change from the fourth range RR4 to the second range RR2 is detected at time t23, and a change from the second range RR2 to the fourth range RR4 is detected at time t24. Then, a second small width up-and-down transmission ratio change operation is detected. Thereafter at time t25, a change from the fourth range RR4 to the second range RR2 is detected, and a change from the second range RR2 to the fourth range RR4 is detected at time t26. Then, a third small width up-and-down transmission ratio change operation is detected. Accordingly, the small width up-and-down transmission ratio change operation flag FSLUD is set to "1" at time t26, and the air-discharge completion flag FNOAIR is also set to "1".

In the example shown in FIG. 7(c), a change from the fourth range RR4 to the second range RR2 is detected at time t31, and a change from the second range RR2 to the fourth range RR4 is detected at time t32. Then, a first small width up-and-down transmission ratio change operation is detected. Thereafter, a change from the fourth range RR4 to the second range RR2 is detected at time t33, and a change from the fifth range RR5 to the first range RR1 is detected at time t34. Thereafter at time t55, a change from the second range RR2 to the fourth range RR4 is detected. Then, a second small width up-and-down transmission ratio change operation is detected. Thereafter at time t36, a change from the first range RR1 to the fifth range RR5 is detected. Then, one large width up-and-down transmission ratio change operation is detected. Accordingly, the large width up-and-down transmission ratio change operation flag FLGUD is set to "1" at time t36, and the air-discharge completion flag FNOAIR is also set to "1".

In the example shown in FIG. 7(d), a change from the fourth range RR4 to the second range RR2 is detected at time t41, a change from the fifth range RR5 to the first range RR1 is detected at time t42, and a change from the second range RR2 to the fourth range RR4 is detected at time t43. Then, a first small width up-and-down transmission ratio change operation is detected. Thereafter at time t44, a change from the fourth range RR4 to the second range RR2 is detected, and a change from the second range RR2 to the fourth range RR4 is detected at time t45. Then, a second small width up-and-down transmission ratio change operation is detected. Thereafter at time t46, a change from the fourth range RR4 to the second range RR2 is detected, and a change from the second range RR2 to the fourth range RR4 is detected at time t47. Then, a third small width up-and-down transmission ratio change operation is detected. Accordingly, the small width up-and-down transmission ratio change operation flag FSLUD is set to "1" at time t47, and the air-discharge completion flag FNOAIR is also set to "1".

In the example shown in FIG. 7(e), a change from the fourth range RR4 to the second range RR2 is detected at time t51, and a change from the second range RR2 to the fourth range RR4 is detected at time t52. Then, a first small width up-and-down transmission ratio change operation is detected. Thereafter at time t53, a change from the fourth range RR4 to the second range RR2 is detected, and a change from the second range RR2 to the fourth range RR4 is detected at time t54. Then, a second small width up-and-down transmission ratio change operation is detected. Thereafter at time t55, a change from the fourth range RR4 to the second range RR2 is detected, and a change from the second range RR2 to the fourth range RR4 is detected at time t56. Then, a third small width up-and-down transmission ratio change operation is detected. Accordingly, the small width up-and-down transmission ratio change operation flag FSLUD is set to "1" at time t56, and the air-discharge completion flag FNOAIR is also set to "1".

In the above description, the ranges RR1-RR5 to which the transmission ratio RATIO belongs are stored as the transmission ratio change history. Actually, by detecting that the transmission ratio RATIO crosses the boundary transmission ratios R1-R4 from the upper side to the lower side or from the lower side to the upper side, in other words, by detecting the range change of the transmission ratio RATIO, the detected range changes may be stored as the transmission ratio change history. The large width up-and-down transmission ratio change operation and the small width up-and-down transmission ratio change operation can be determined based on the stored range changes.

Figure 8:
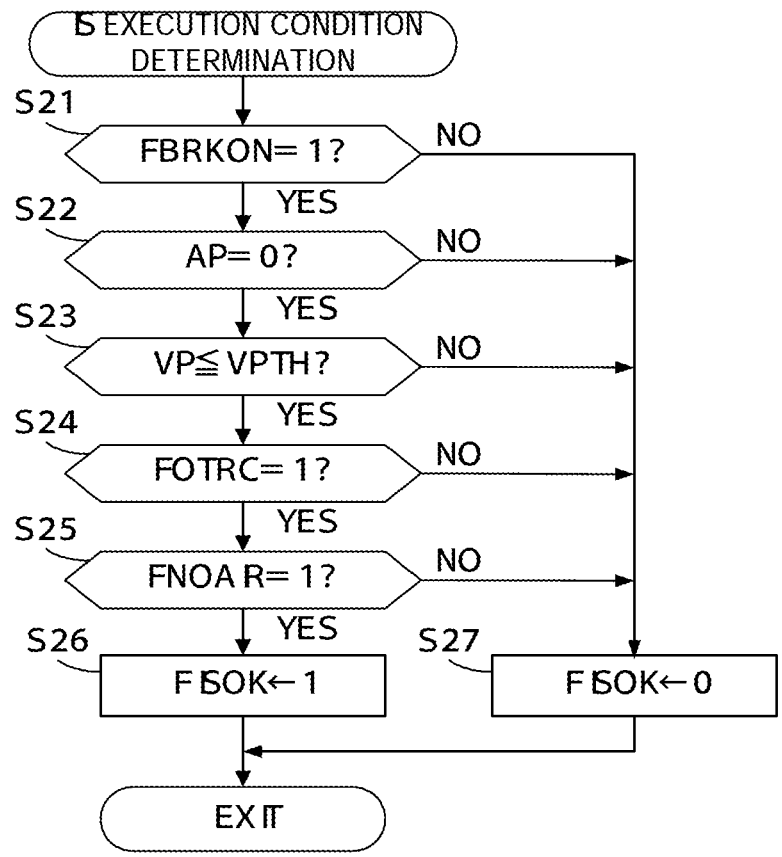
FIG. 8 is a flowchart of a process for determining a predetermined idling stop execution condition.

FIG. 8 is a flowchart of a process for determining a predetermined idling stop execution condition. This process is executed by the ECU 51 at predetermined time intervals.

In step S21, it is determined whether or not a brake-on flag FBRKON is "1". The brake-on flag FBRKON is set to "1" when the brake pedal of the present vehicle is depressed. If the answer to step S21 is affirmative (YES), it is determined whether or the accelerator operation amount is "0" (step S22). If the answer to step S22 is affirmative (YES), it is further determined whether or not the vehicle speed VP is equal to or lower than a predetermined vehicle speed VPTH (step S23).

If the answer to step S23 is affirmative (YES), it is determined whether or not an other requirement determination flag FOTRC is "1" (step S24). The other requirement determination flag FOTRC is set to "1" when the requirements, such as the engine coolant temperature TW is equal to or higher than a predetermined temperature, i.e., the warm-up of the engine 1 is completed, and the residual charge amount of the battery which supplies power to the starter motor of the engine 1, is greater than a predetermined amount, are satisfied.

If the answer to step S24 is affirmative (YES), it is determined whether or not the air-discharge completion flag FNOAIR is "1" (step S25). If any one of the answers to steps S21-S25 is negative (NO), it is determined that the predetermined idling stop execution condition is not satisfied, and an idling stop execution flag FISOK is set to "0" (step S27). Accordingly, the idling stop is not performed.

If the answer to step S25 is affirmative (YES), the predetermined idling stop execution condition is determined to be satisfied, and the idling stop execution flag FISOK is set to "1" (step S26). Accordingly, the idling stop is performed.

As described above, in this embodiment, the transmission ratio change history of the CVT 4 after the ignition switch of the vehicle is turned on, is stored, and the predetermined idling stop execution condition is satisfied on condition that the transmission ratio change history includes one large width up-and-down transmission ratio change operation, or three small width up-and-down transmission ratio change operations, and the air-discharge completion flag FNOAIR is "1". In other words, if the stored transmission ratio change history includes neither one large width up-and-down transmission ratio change operation nor three small width up-and-down transmission ratio change operations, the idling stop is not performed even if all of the answers to steps S21-S24 of FIG. 8 are affirmative (YES), i.e., the other execution requirements are satisfied. By performing one large width up-and-down transmission ratio change operation or three small width up-and-down transmission ratio change operations, the air contained in the cylinder chambers 25c and 27c of the CVT 4 is discharged. Accordingly, the idling stop is prevented from being performed in the air-contained state of the cylinder chambers, which makes it possible to avoid the vehicle start hesitation upon restarting the engine after the idling stop.

Further, the air discharge is determined to be completed if one large width up-and-down transmission ratio change operation or three small width up-and-down transmission ratio change operations is/are performed. Accordingly, it is possible to perform the condition determination suitable to various vehicle running conditions, which can hasten the timing at which the predetermined idling stop execution condition is satisfied, within the range where the vehicle start hesitation can be avoided.

Further, flowing-in of the operation oil to the cylinder chamber 25c of the drive-pulley 25 and flowing-out of the operation oil from the cylinder chamber 25c are performed through the communication passage 42 which communicates the cylinder chamber 25c to the oil passage 43 provided within the pulley drive shaft 24 which is a rotation shaft of the movable pulley half-body 25b. When the movable pulley half-body 25c rotates, air of smaller density compared with the operation oil moves toward the pulley drive shaft 24, thereby making it possible to surely discharge the air contained in the cylinder chamber 25c via the communication passage 42 and the oil passage 43. The air contained in the cylinder chamber 27c of the driven-pulley 27 can also be discharged similarly.

Further, discharge of the oil pump 71 ends at the time when a time period of about 30 minutes has elapsed from the time the ignition switch is turned off, and air begins to enter the cylinder chambers, which may cause the vehicle start hesitation. Accordingly, by storing the transmission ratio change history whenever the ignition switch is turned on and performing the air-discharge check based on the stored history, it is possible to surely avoid the vehicle start hesitation upon restarting the engine after the idling stop.

In this embodiment, the oil pressure control device 40 and the ECU 50 constitute the oil pressure control means, the ECUs 50 and 51 constitute the idling stop control means, and the ECU 51 constitutes the transmission ratio change history storing means. The cylinder chambers 25c and 27c correspond to the oil pressure chamber.

The present invention is not limited to the embodiment described above, and various modifications may be made. For example, in the above-described embodiment, the first and second transmission ratio change history determination processes are executed in parallel. Alternatively, only one of the two processes may be executed, and the air-discharge completion flag FNOAIR may be set based on the determination result of the executed process.

Further, in the above-described embodiment, five transmission ratio ranges RR1-RR5 are set for storing the transmission ratio change history. The number of ranges is not limited to five, and more transmission ratio ranges may be set for storing the transmission ratio change history.

DESCRIPTION OF REFERENCE NUMERALS

1 Internal combustion engine
4 Continuously variable transmission
25c, 27c Cylinder chamber (oil pressure chamber)
40 Oil pressure control device (oil pressure control means)
50 Electronic control unit for transmission control (oil pressure control means, idling stop control means, transmission ratio change history storing means)
51 Electronic control unit for engine control (idling stop control means)
61 Pulley drive shaft rotational speed sensor (transmission ratio change history storing means)
62 Output shaft rotational speed sensor (transmission ratio change history storing means)
71 Oil pump

The invention claimed is:

1. A control apparatus for a vehicle provided with an internal combustion engine, an oil pump actuated by said engine for pressurizing operation oil, and a belt-type continuously variable transmission to which the operation oil pressurized by said oil pump is supplied, said control apparatus comprising:
oil pressure control means for performing a transmission control by controlling an operation oil pressure supplied to a drive-pulley and a driven-pulley of said continuously variable transmission;
idling stop control means for automatically stopping said engine when a predetermined condition is satisfied; and
transmission ratio change history storing means for storing a transmission ratio change history of said continuously variable transmission after an ignition switch of said vehicle is turned on,
wherein the predetermined condition is satisfied on condition that the transmission ratio change history includes a predetermined transmission ratio change history, and
wherein each of said drive-pulley and said driven-pulley has an oil pressure chamber to which the operation oil is supplied, and the predetermined transmission ratio change history is set to such a history that air contained in said oil pressure chambers is discharged.

2. The control apparatus according to claim 1, wherein the predetermined transmission ratio change history is a history in which a transmission ratio change from a transmission ratio within a first transmission ratio range to a transmission ratio within a second transmission ratio range and a transmission ratio change from a transmission ratio within the second transmission ratio range to a transmission ratio within the first transmission ratio range, are performed.

3. The control apparatus according to claim 1, wherein the predetermined transmission ratio change history is a history including a plurality of histories in which a transmission ratio change from a transmission ratio within a third transmission ratio range to a transmission ratio within a fourth transmission ratio range and a transmission ratio change from a transmission ratio within the fourth transmission ratio range to a transmission ratio within the third transmission ratio range, are performed.

4. The control apparatus according to claim 1, wherein the predetermined transmission ratio change history is one of a first history and a second history, the first history being a history in which a transmission ratio change from a transmission ratio within a fifth transmission ratio range to a transmission ratio within a sixth transmission ratio range and a transmission ratio change from a transmission ratio within the sixth transmission ratio range to a transmission ratio within the fifth transmission ratio range, are performed, and the second history being a history including a plurality of histories in which a transmission ratio change from a transmission ratio within a seventh transmission ratio range to a transmission ratio within an eighth transmission ratio range and a transmission ratio change from a transmission ratio within the eighth transmission ratio range to a transmission ratio within the seventh transmission ratio range, are performed,
wherein the fifth transmission ratio range is a transmission ratio range in which said vehicle can start, and the seventh and eighth transmission ratio ranges are positioned between the fifth transmission ratio range and the sixth transmission ratio range.

5. The control apparatus according to claim 1, wherein each of said drive-pulley and said driven-pulley comprises a fixed pulley half-body and a movable pulley half-body, and is configured so that the operation oil is supplied to an oil pressure chamber of said movable pulley half-body,
wherein flowing-in of the operation oil to said oil pressure chamber and flowing-out of the operation oil from said oil pressure chamber are performed through a communication passage which communicates said oil pressure chamber to an oil passage provided within a rotation shaft of said movable pulley half-body.

6. The control apparatus according to claim 1, wherein said transmission ratio change history storing means stores the transmission ratio change history whenever said ignition switch is turned on.

* * * * *